United States Patent
Koch et al.

(10) Patent No.: US 7,658,396 B2
(45) Date of Patent: Feb. 9, 2010

(54) ARTICULATED VEHICLE MADE FROM SEVERAL VEHICLE PARTS WHICH ARE COUPLABLE TOGETHER

(75) Inventors: Robert Koch, Bad Sooden-Allendorf (DE); Lothar Scharf, Bad Sooden-Allendorf (DE); Jens Karasek, Kaufungen (DE)

(73) Assignee: Hübner GmbH, Kassel (DE)

( * ) Notice: Subject to any disclaimer, the term of this patent is extended or adjusted under 35 U.S.C. 154(b) by 220 days.

(21) Appl. No.: 11/811,583

(22) Filed: Jun. 11, 2007

(65) Prior Publication Data

US 2007/0296180 A1 Dec. 27, 2007

(30) Foreign Application Priority Data

Jun. 9, 2006 (DE) .................. 20 2006 009 083 U
Sep. 19, 2006 (DE) .................. 20 2006 014 539 U

(51) Int. Cl.
*B60D 5/00* (2006.01)
(52) U.S. Cl. ........................................ 280/403; 105/18
(58) Field of Classification Search ................ 280/403; 105/18, 19, 20
See application file for complete search history.

(56) References Cited

U.S. PATENT DOCUMENTS 4,252,065 A * 2/1981 Bickel et al. .................. 105/10
4,421,339 A * 12/1983 Hagin ..................... 280/460.1
4,482,165 A * 11/1984 Dawson et al. .............. 280/432
4,765,249 A 8/1988 Ishizuka et al.
6,772,698 B2 * 8/2004 Ueta et al. ..................... 105/3

FOREIGN PATENT DOCUMENTS

| DE | 3340446 | 5/1985 |
|---|---|---|
| DE | 3407327 | 8/1985 |
| DE | 19503081 A1 | 2/1995 |
| EP | 0038082 | 10/1981 |
| EP | 0567950 | 11/1993 |
| EP | 1 513 716 | 5/2006 |
| EP | 1 531 117 | 5/2006 |
| GB | 2009691 | 6/1979 |
| WO | 95/06580 | 3/1995 |
| WO | 97/42045 | 11/1997 |
| WO | 03/106238 | 12/2003 |

* cited by examiner

*Primary Examiner*—Kevin Hurley
(74) *Attorney, Agent, or Firm*—Thomas R. Vigil

(57) ABSTRACT

The invention relates to an articulated vehicle consisting of several vehicle parts (1, 2) which are couplable together, each vehicle part (1, 2) comprising at least two axles and one coupling frame (12) that is connected to said vehicle part (1, 2) through a bellows (13), a joint device (20, 31) being provided between said vehicle part (1, 2) and said coupling frame (12), said joint device (20, 31) comprising a coupling carrier (30) that is located approximately in the plane of said coupling frame (12), said coupling carrier (30) comprising at least coupling means (25) for coupling to the joint device (20, 31) of the other vehicle part (1, 2).

24 Claims, 7 Drawing Sheets

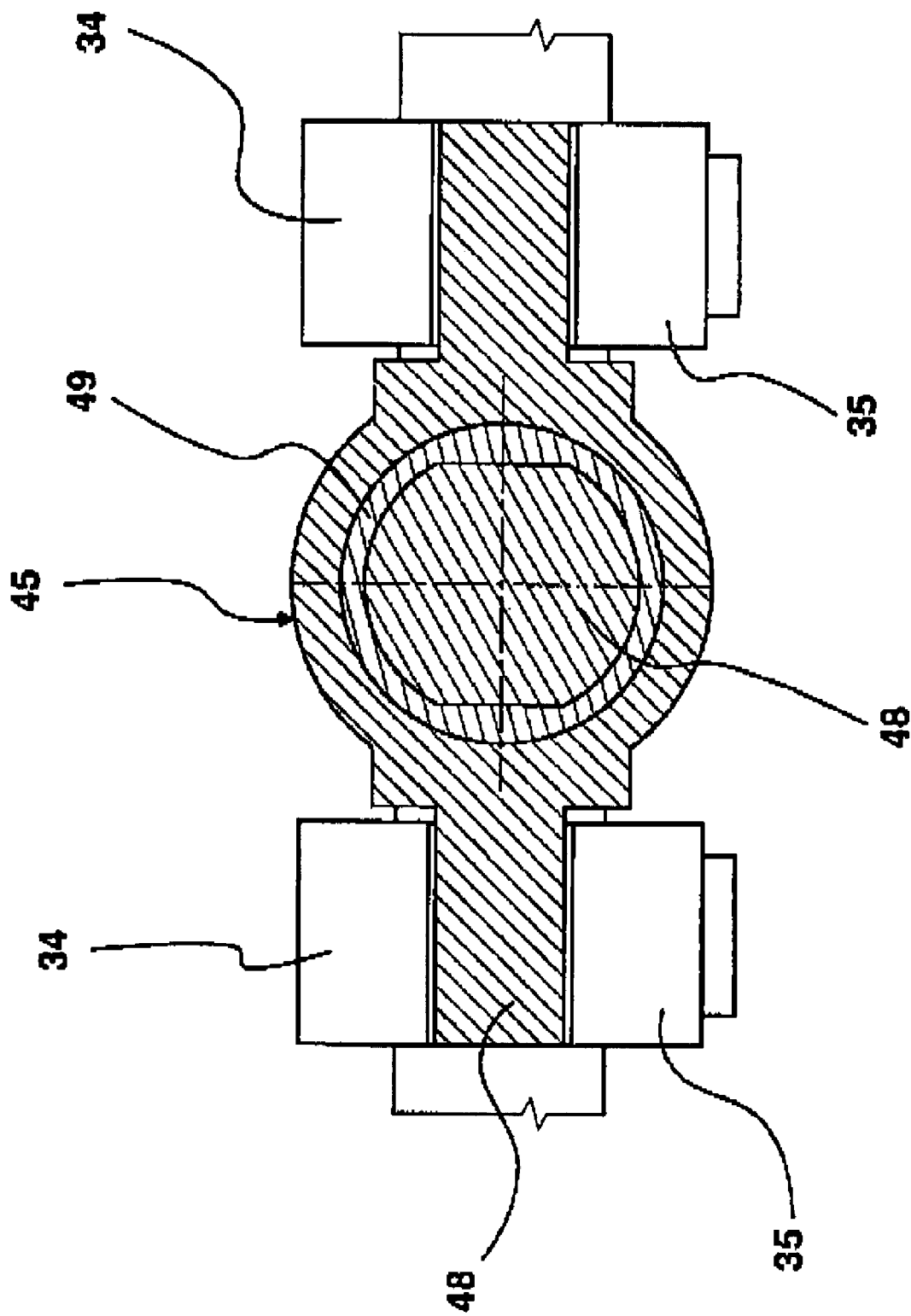

ARTICULATED VEHICLE MADE FROM SEVERAL VEHICLE PARTS WHICH ARE COUPLABLE TOGETHER

CROSS-REFERENCE TO RELATED APPLICATIONS

This application claims Priority from German Application Nos. DE 20 2006 009 083.5 filed on 9 Jun. 2006 and DE 20 2006 014 539.7 dated 19 Sep. 2006

FIELD OF THE INVENTION

The present invention relates to an articulated vehicle made from several vehicle parts which are couplable together.

DESCRIPTION OF THE PRIOR ART

An articulated vehicle made from several parts coupled together is sufficiently known in prior art (EP 1 531 117). More specifically, articulated vehicles having a couplable trailer are known, said trailer being connected to the tractor unit by a connection for persons to pass from one vehicle part to the other. Such a couplable articulated vehicle takes into account the fact that busses e.g., have more spare capacities is in terms of seats at certain hours of the day than at others. Meaning that such an articulated vehicle, which has a trailer adapted for connection by coupling to the tractor unit, allows for adapting to the respectively required transport capacities.

What are termed double articulated busses are further known, these vehicles having a capacity of far more than 250 persons. The various cars of these articulated busses are not couplable together in the sense that their capacity be adaptable to the existing requirements by coupling together various vehicle parts. The disadvantage of such a double articulated vehicle is more specifically that such vehicles have quite large a turning circle if the rear axles are not configured to be steerable.

Moreover, there are known tramway sets consisting of discrete cars which however are also solidly joined together, the term "solidly" being understood in this context to refer to the fact that the capacity of such tramway sets cannot be adapted to the prevailing circumstances.

Another disadvantage of tramway sets also is that the infrastructure for operating a tramway, namely the laying of rails and overhead contact lines in particular, involves considerable costs. This means that operating tramways is quite expensive although with less impact on the environment. Bus operation on public roads, in contrast, is much cheaper since it does not need a special infrastructure. Another advantage of tramways also is that they may act as what are termed "bi-directional vehicles".

BRIEF SUMMARY OF THE INVENTION

It is the object of the invention to provide an articulated vehicle for road traffic consisting of several vehicle parts which are couplable together that combines the advantages of tramway sets and the benefits of articulated busses, more specifically of such articulated busses the vehicle parts of which are couplable together in the sense of an adaptation to the transport capacity required.

In accordance with the invention, this object is solved by an articulated vehicle consisting of several vehicle parts which are couplable together, each vehicle part comprising a coupling frame that is connected to the vehicle part through a bellows, a joint device being provided between the vehicle part and the coupling frame, said joint device comprising a coupling carrier that is located approximately in the plane of the coupling frame, said coupling carrier comprising at least coupling means for coupling to the joint device of the other vehicle part. It is obvious therefrom that the vehicle parts which are couplable together are identically built in the region of the coupling. This means that, due to the symmetry, each vehicle part is couplable ad lib to any other vehicle part, so that an enormous range of variation is obtained by connecting discrete vehicle parts.

It may for example be envisaged to couple together two autonomous busses, meaning busses having two axles each, in order to thus obtain what is termed a "bi-directional vehicle". It is also contemplated to interpose a third passive vehicle part, for example in the form of a trailer with two axles as well, between two thus active vehicle parts. An articulated vehicle in the form of a bus configured in this way is already very similar to a tramway set except for the fact that it does not need rails but is rather capable of travelling on ordinary roads. More specifically, such an articulated vehicle, which may be up to 50 m in length, needs no so-called "terminal loop", which needs considerable space; here the driver of the vehicle only needs to pass from the one bus part to the other one since this vehicle is a so-called "bi-directional vehicle" if a substantially autonomous bus in the sense of an active vehicle is coupled to either side of the vehicle. Now, capacity adaptation is obtained by the fact that, except for an intermediate trailer possibly provided as a passive vehicle part, each of the two active vehicle parts may be driven alone. This means that such an articulated vehicle combines the advantages of a tramway and those of an articulated bus the capacity of which may additionally be adapted.

Further advantageous features will become apparent from the subordinate claims.

As is known, articulated vehicles are subjected to the most diverse kinds of motion. The joints must be capable of absorbing roll, pitch as well as buckling. Roll is understood to refer to motions causing the two vehicle parts to relatively rotate along their longitudinal axis, buckling refers to motions occurring when the articulated vehicle comprised of two vehicle parts negotiates a curve, whilst pitch occurs when such an articulated vehicle travels through a hollow or a hilltop.

Hitherto, it was assumed that, by virtue of the intrinsic elasticity of the chassis of the respective one of the vehicle parts, the roll was absorbed by the very chassis. This assumption originated in particular from the fact that the maximum roll angle was 10°, usually however only between 5° and 7°. In the meantime however it has been found that even with such relatively small roll angles, the moments acting onto the joint or onto the chassis are of up to 30 KNm. Accordingly, damages to chassis and/or joints cannot be excluded.

In order to reduce the moments acting onto the chassis and/or the joint due to roll, there is further proposed, in accordance with an advantageous feature of the invention, that the joint device comprises several bearings, each bearing allowing a movement in at least one different direction in space, the bearings communicating together. If, as a result thereof, one bearing is provided for each direction in space in order to absorb the corresponding movements, the strain on both the joint and the chassis of the vehicle parts is naturally relieved.

Accordingly, there is more specifically provided that a buckling joint with a vertical axis is disposed on the coupling carrier, that at least one pitch joint having a pitch axis oriented parallel to the transverse axis of the vehicle is provided on the chassis of the vehicle part and that a roll joint having an axis oriented parallel to the longitudinal axis of the vehicle is disposed on the chassis of the vehicle part. The pitch joint is configured to be a sliding bearing. More specifically, on an articulated vehicle set having its two vehicle parts comprising two axles each, such a construction allows for keeping the forces and moments acting onto both the joint and the chassis of the vehicle parts is within tolerable limits for the material.

More specifically, there is provided that the pitch joint accommodates the roll joint. Combining both the pitch joint and the roll joint into one unit has the advantage of a space-saving construction even if the joint as such will not allow for combined pitch and roll motion, discrete joint parts being rather combined together in this sense.

More specifically, the roll joint exhibits a roll joint housing, the pitch joint being mounted to the roll joint housing. For connecting the roll joint housing to the pitch joint, the roll joint housing is provided with two laterally projecting pitch bearing journals forming part of the pitch joint. The roll joint comprises a pivot member that is carried in the roll joint housing for rotation about a dictatable angle of rotation. In this context, the following is noted:

In order to allow persons to pass from one of the two hinge-linked vehicle parts to the other, there is more specifically provided a gangway connection in the form of a bridge or a platform, said connection platform comprising a rotary plate. The two vehicle parts which are couplable together are joined together in the region of a respective coupling carrier. Each joint device is fastened to the chassis on the one side and to said aforementioned coupling carrier on the other side, the two vehicle parts being finally couplable together by means of said coupling carrier. The connection platform now spans the two joint devices together, with the coupling carriers connecting them together. Due to the roll bearing, which allows for rotation of the parts connected thereto about the longitudinal axis of the vehicle, it must now be made certain that the connection platform extending across the two joint devices will not rotate in the axis of rotation of the roll joint. Accordingly, means are to be provided for preventing such a rotation of the platform connection, and as a result thereof, of the component parts disposed between the two opposite roll joints. Accordingly, there is provided that the pivot member is carried for rotation against a force in the roll joint housing. This means that quite large a moment occurs at small angles already and does not substantially increase at larger angles. The maximum moment is limited to a fixed value through appropriate measures. This permits taking into account that rotation of the connection platform should not only occur through wind load or through persons standing off center on the connection platform.

In this context, there is more specifically provided that the pivot member is carried in an elastomer body in the roll joint housing.

According to another feature of the invention, the roll joint is connected to the buckling joint by what is referred to as a joint carrier. Said joint carrier thereby preferably comprises a damping element that is connected to the coupling carrier and dampens the motion of the joint device, during cornering for example, as is already known.

Another subject matter of the invention is the connection of the two joint devices through the coupling carriers, which comprise coupling means for coupling the vehicle parts.

There is particularly provided that the coupling means are located on the coupling carrier, in the region of the center longitudinal axis of the articulated vehicle. The coupling means hereby are male and female coupling means that are disposed on either side of the center longitudinal axis of the articulated vehicle, which means that the arrangement is symmetrical.

There is further provided that further female and male coupling members for electrical, compressed air and/or hydraulic lines are provided on either side of the coupling means on the coupling carrier in order to transport energy and also data from the driven vehicle to the other passive vehicle parts.

According to another advantageous feature, there is provided that the car comprises, in the region of the bottom, an insertion opening for receiving the joint. This means that the joint device is adapted to be inserted, at least in parts, into the car floor, the insertion depth of the joint device being substantially determined by the maximum compressibility of the bellows and the strength of the coupling frame. In this context, an insertion frame for accommodating the respective one of the joint devices is disposed in each insertion opening of a vehicle part.

According to another, particularly advantageous feature of the invention, the coupling frame comprises a mounting frame that is peripherally disposed about the coupling frame and serves to fasten the bellows. This means that this mounting frame has an outer contour that substantially corresponds to the contour of the bellows or of the car or vehicle part. As already mentioned above, the coupling carrier comprises male and female coupling members for electrical, compressed air and/or hydraulic lines. According to a variant, it may be contemplated to provide the mounting frame in the roof region of the bellows, in the center longitudinal axis of the articulated vehicle, with male and female coupling members for electrical, compressed air and/or hydraulic lines, the coupling members having to be distributed symmetrically with respect to the center longitudinal axis of the vehicle. The symmetrical arrangement of the coupling members is the prerequisite needed for the discrete cars, meaning both the passive and the active cars, to be couplable together ad lib. Only then will the desired wide range of variation be given in practical use, in particular with regards to the desired adaptation of the transport capacities.

In order to ensure that the front side opening can be closed in the decoupled condition of the discrete vehicle parts, means for closing the opening are provided; different embodiments for closing the opening on the front side of the vehicle may be considered thereby. On the one side, there may be considered to cover the entire rear cart with a roller blind when the bellows is retracted, meaning when the joint is retracted as well, or there is the possibility to cover the rear end of such a vehicle with a hood.

The invention will be explained in further detail hereinafter by way of example with reference to the drawings.

BRIEF DESCRIPTION OF THE DRAWING

FIG. 7a is a schematic sectional view taken through the pitch and roll joint.

DETAILED DESCRIPTION OF THE INVENTION

Figure 1:
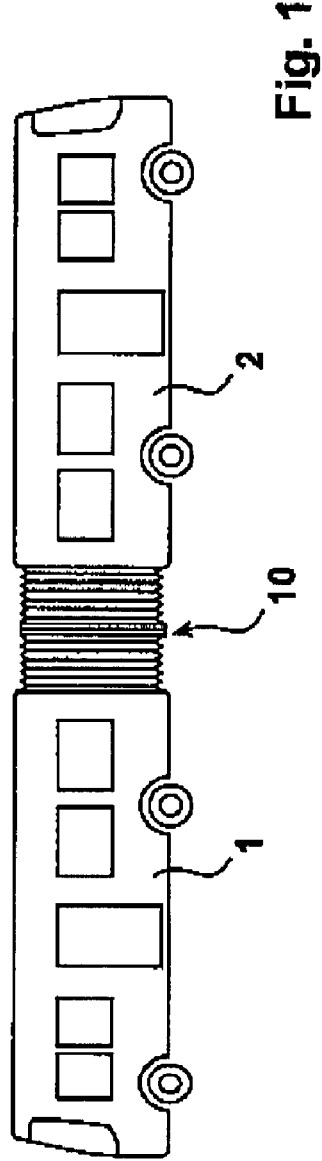
FIG. 1 shows an articulated vehicle with two active vehicle parts.

An articulated vehicle according to FIG. 1 consists of two active vehicles 1 and 2 that are connectable together by a connecting device 10. An active vehicle part is understood to refer to a vehicle part with two axles that may participate independently in road traffic since it is equipped with an independent drive and with a driver's cab of its own.

Figure 2:
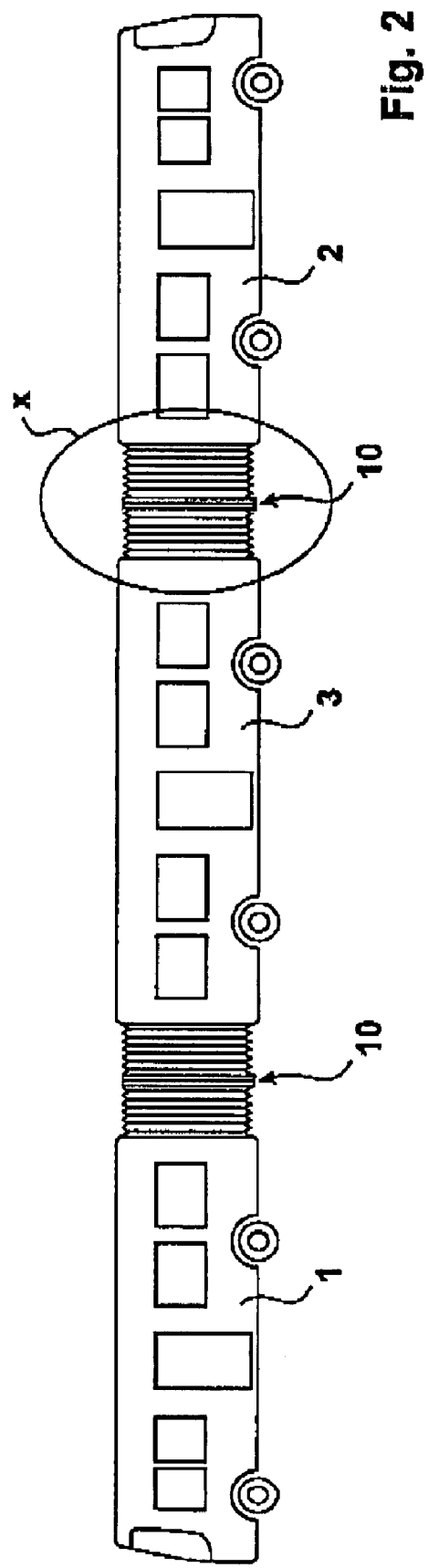
FIG. 2 shows an articulated vehicle with two active vehicle parts between which there is disposed a passive vehicle part.

In the embodiment shown in FIG. 2 there are provided active vehicle parts 1 and 2 between which there is disposed a third vehicle part 3 which, although passive, also has two axles, the discrete vehicle parts communicating together through connecting devices 10.

Figure 3:
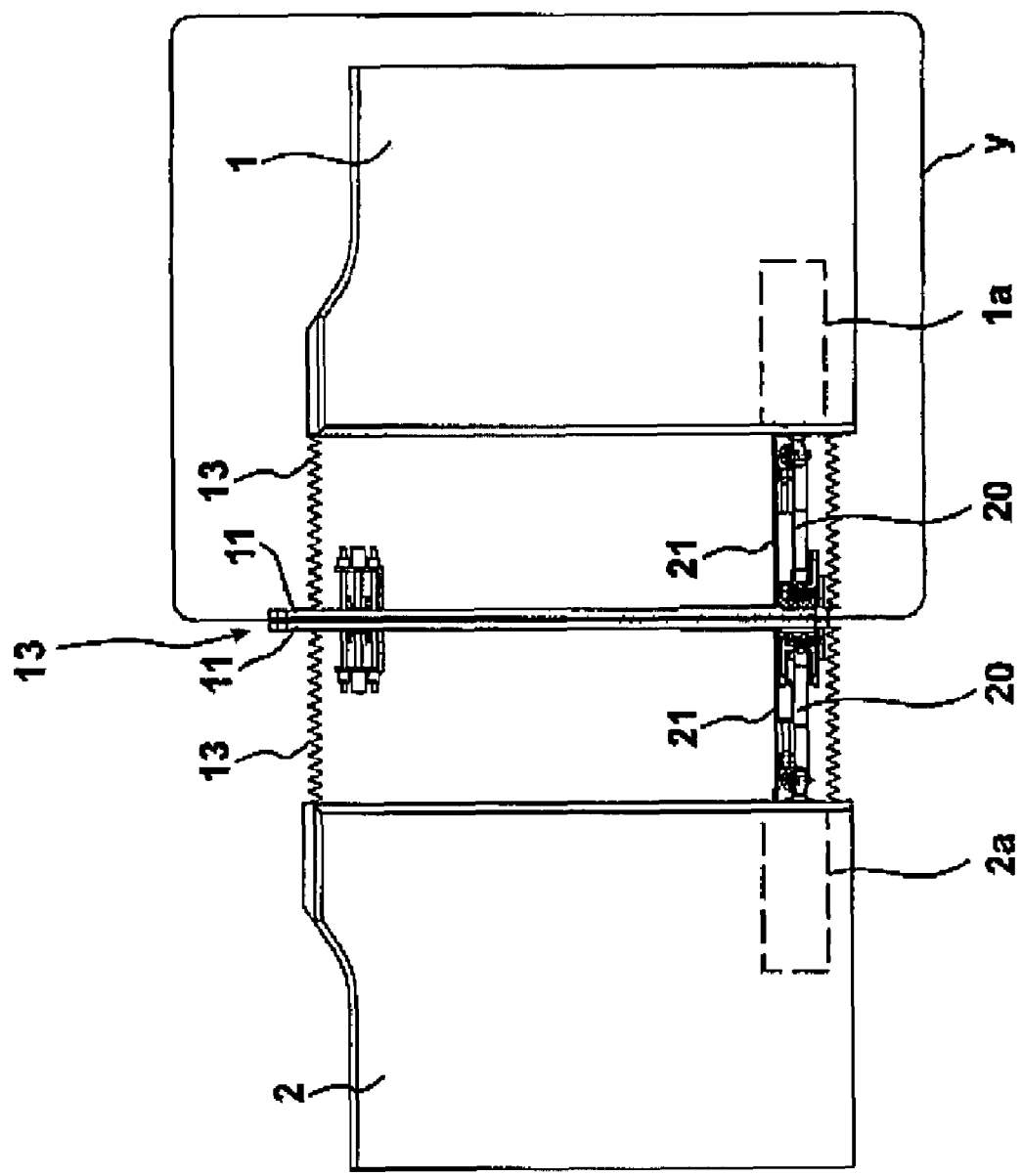
FIG. 3 shows the detail x of FIG. 2 in a side view.

Such a connecting device 10 appears in the representation in FIG. 3. The connecting device 10 includes the two mounting frames 11 as well as the coupling frame 12 disposed within a respective one of the mounting frames 11, as can be seen from the illustration in FIG. 4 and FIG. 5. The mounting frames 11 each comprise a bellows 13 that is connected at the other end with the vehicle part. The two vehicle parts 1 and 2 further show a joint device 20, a platform 21 being located above a respective one of the joint devices 20.

Figure 4:
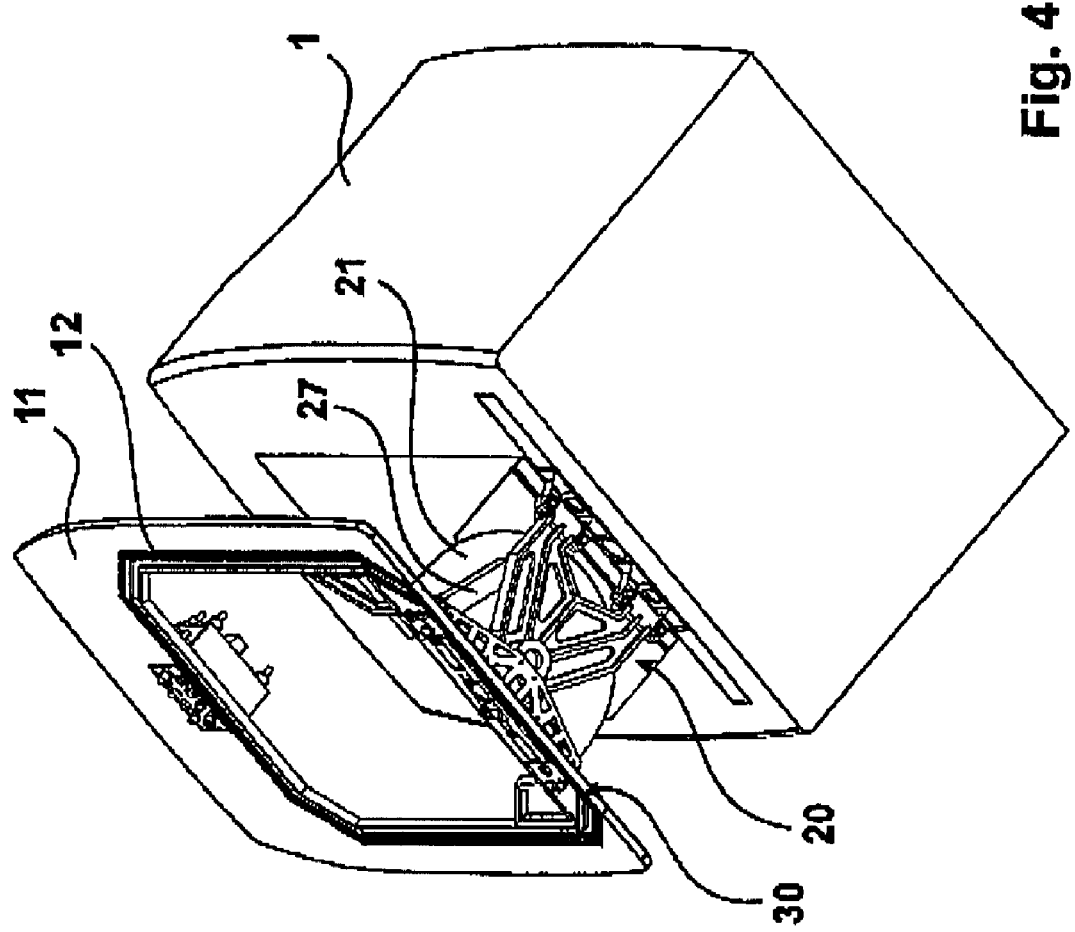
FIG. 4 shows the detail y of FIG. 3 in a perspective illustration, when viewed from the bottom.
Figure 5:
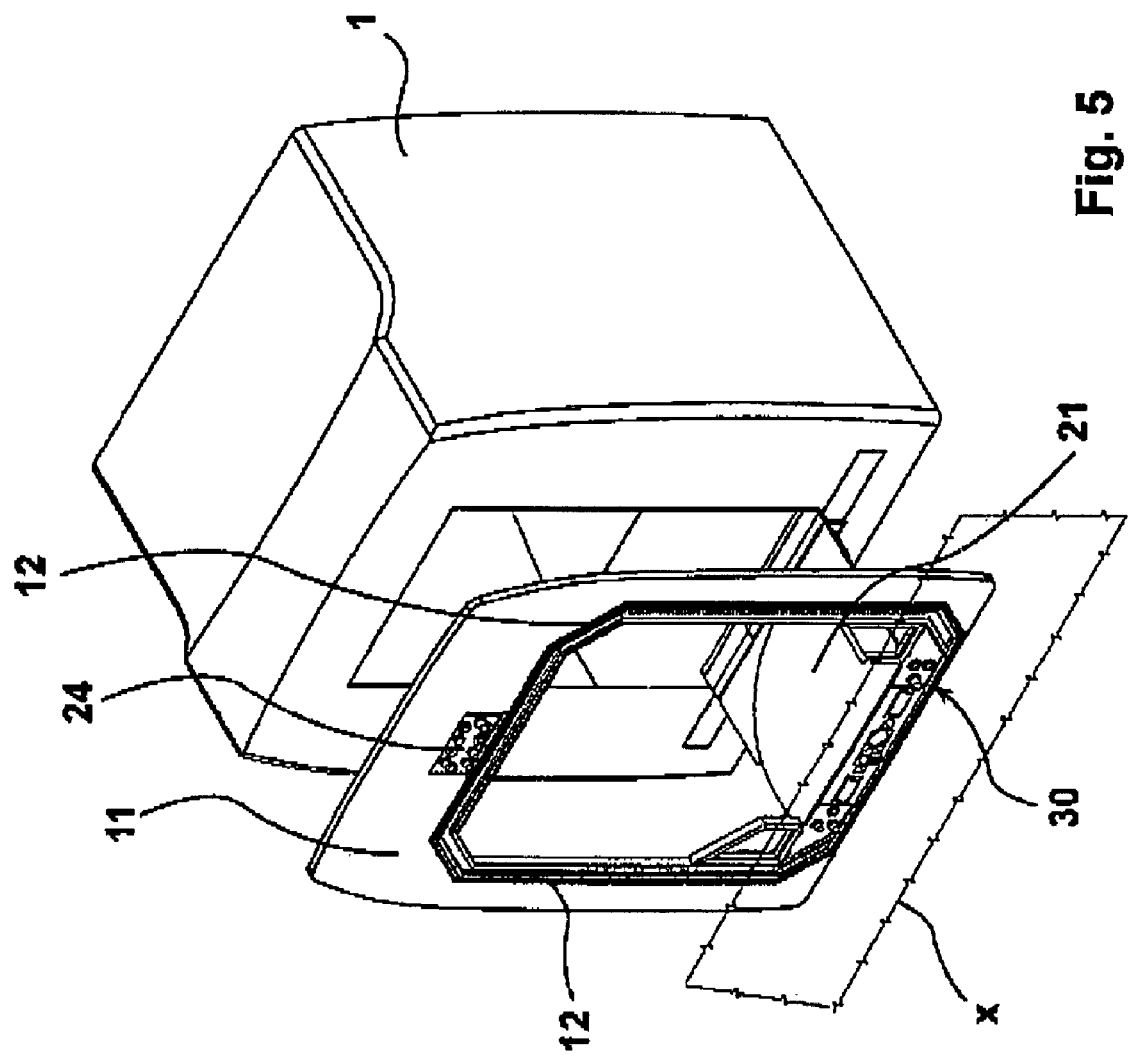
FIG. 5 shows the detail y of FIG. 3 in a perspective illustration from the top.
Figure 6:
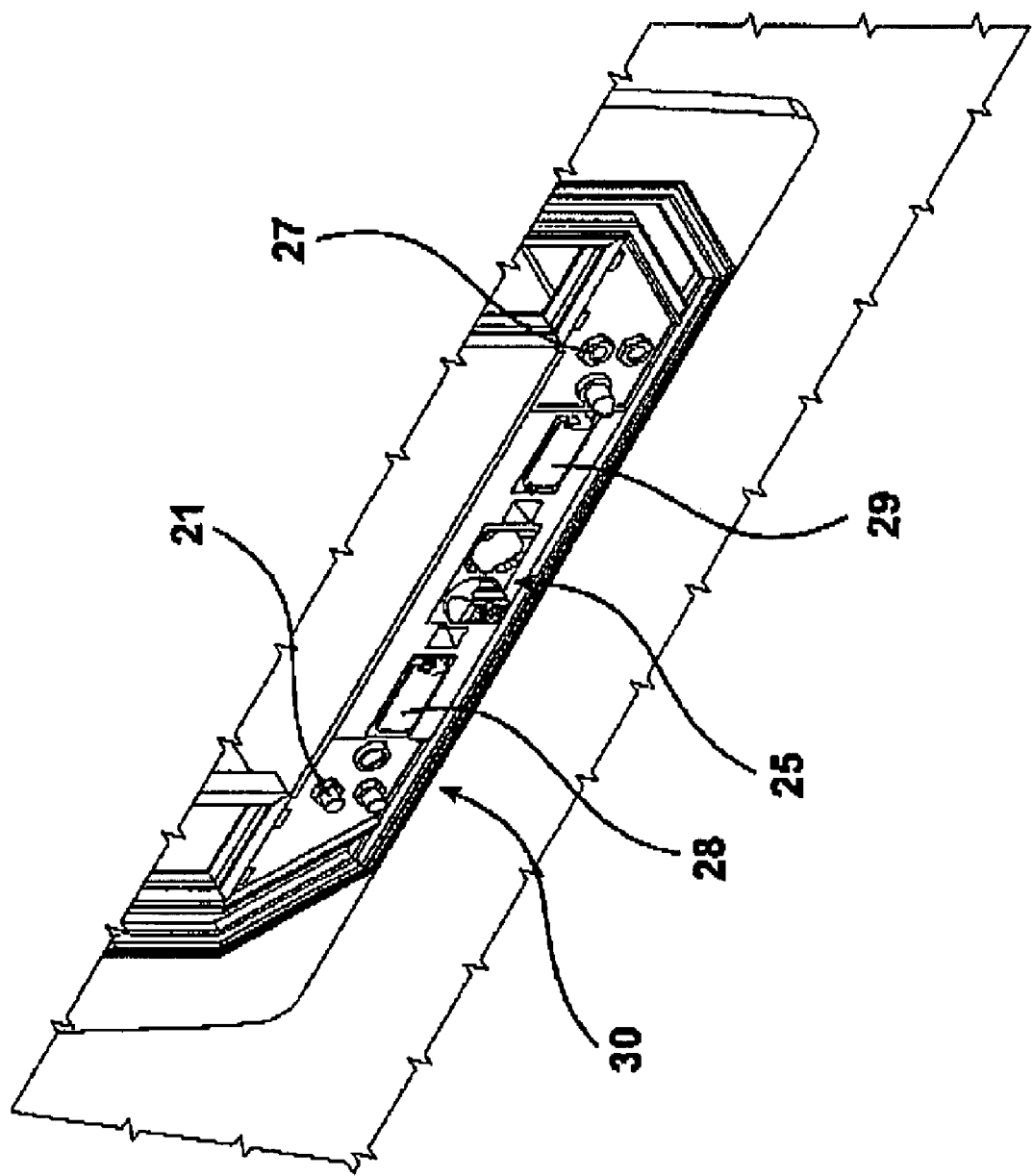
FIG. 6 shows the cutout z of FIG. 5 at a larger scale.

The other details of the configuration of a connection between the respective car and the mounting frame are best shown in the FIGS. 4 and 5 in particular. As already mentioned, the coupling frame 12 accommodates the mounting frame 11. The coupling frame 12 comprises the coupling carrier 31 in the region of the joint device 20 (FIG. 5, FIG. 6), said coupling carrier 30 comprising on the one side the coupling means 25 for mechanical connection of the two vehicles relative to each other and on the other side further coupling members on either side of the center longitudinal axis of the vehicle, in particular male and female coupling members 26, 27 as well as an electric coupling 28, 29, it being noted again here that the coupling members on one side of the center longitudinal axis of the articulated vehicle are configured to be either male or female. The mechanical coupling for connecting the two vehicle parts together is also disposed with male and female coupling members to a respective side of the center longitudinal axis of the vehicle, the use of a "Scharfenberg® coupling" being advisable here. Such type couplings each comprise cone and funnel with the corresponding coupling members. In the ceiling region of the coupling frame 12, there are provided further supply couplings 24 that are again disposed on either side of the center longitudinal axis of the vehicle in such a manner that the coupling elements of the two vehicles correspond to each other during the coupling process. The joint device 20 comprises a damper 27 that is connected to the coupling carrier 30 on the one side and to the joint device on the other side.

Figure 7:
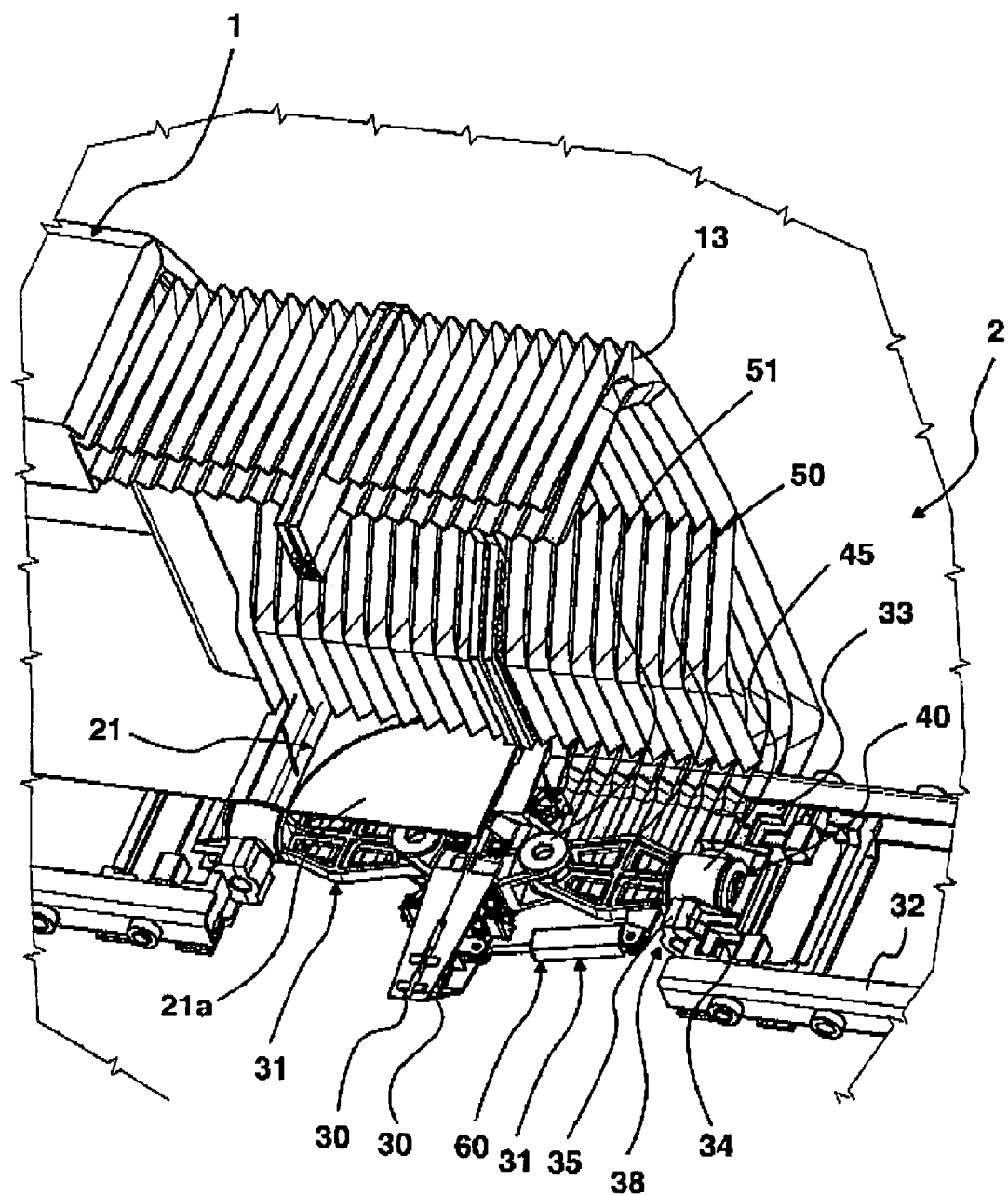
FIG. 7 shows an isometric representation of the connection between two vehicle parts by means of two joint devices that are couplable together through coupling carriers, the right vehicle part having been removed.

In the illustration shown in FIG. 7, two joint devices 31 for connecting the two coupling carriers 30 together are provided. Insertion openings for accommodating the insertion frames 32 are provided in the vehicle parts (not shown). The insertion frames 32 finally accommodate the joint device 31. For this purpose, the insertion frame 32 comprises a frame 33, said frame 33 comprising respectively one part of a collar 34 that accommodates, in connection with a second part 35 of the collar, the pitch bearing journal 41 of the pitch bearing 38 in the form of a so-called sliding bearing. That is to say that the pitch bearing journals glide in the opening formed by the collar. These pitch bearing journals 41 are further disposed on either side of the roll joint housing 45 of the roll joint 40 and ensure that the vehicle is capable of yielding to the movements generated when travelling through hollows or over hilltops as is actually known.

As already explained, the two bearing journals 41 are located on the roll joint housing 45. In the housing 45 of the roll joint the pivot member 48 is also fastened in an elastomer jacket, the pivot member configured in the shape of a polygon (FIG. 7a) being disposed in the elastomer jacket so as to be rotatable about the rotation axis up to a certain torque, this roll bearing however yielding to the forces acting thereon when a certain value is exceeded, thus avoiding damage to the chassis or the joint. In such a case, there could be provided e.g., that the rubber jacket 49 of the roll bearing is destroyed, the pivot member not being completely without moment but still movable in the roll joint housing. The pivot member 48 comprises the joint carrier 50 that is connected to the coupling carrier 30 by a buckling joint 51. The important point is that, thanks to the construction or rather thanks to the mere provision of a roll joint as a constituent part of the joint device in particular, this buckling bearing 51 only needs to absorb negligible loads resulting from occurring roll movements. Accordingly, the buckling joint 51 can be of quite simple construction.

Furthermore, the joint carrier 50 comprises a damping element 60 that is disposed on the joint frame on the one side and on the coupling carrier 30 on the other side.

Above the joint device 31 and also above the coupling carriers 30, there is located the connection platform indicated at 21 and provided with the rotary plate 21a. Said rotary plate 21a is divided in the connection between the two coupling carriers 30 so that the connection platform may also be associated with each vehicle part in its divided state. The rotary plate 21a is carried on the coupling carrier 30 on the one side but also retained by arms (not shown) that are disposed on the joint carrier 50.

The vehicle parts 1 and 2 further show insertion openings 1a and 2a that serve for accommodating both the joint device 20, 31 and the platform 21 when the mounting frame 11 is pulled together with the bellows 13 toward the vehicle. The rear end of the vehicle or the front side opening of the vehicle may be closed, for example with a roller blind (not shown).

It is noted here once more that the vehicles are identical with regards to their front side configuration in the coupling region, meaning that all the parts are provided twice. This is the only way to obtain the desired variability.

We claim:

1. An articulated vehicle comprising several vehicle parts (1, 2) which are couplable together, each vehicle part (1, 2) comprising at least two axles and one coupling frame (12) that is connected to said vehicle part (1, 2) through a bellows (13), a joint device (20, 31) for coupling the vehicle parts (1, 2) together being provided between said vehicle part (1, 2) and said coupling frame (12), said joint device (20, 31) comprising a coupling carrier (30) that is located approximately in the plane of said coupling frame (12), said coupling carrier (30) comprising at least coupling means (25) for coupling to the joint device (20, 31) of the other vehicle part (1, 2), said joint device (31) comprising several bearings (38, 40, 51), each bearing allowing a movement in at least one direction in space, said bearings (38, 40, 51) communicating together, a buckling joint (51) having a vertical axis being disposed on the coupling carrier (30).

2. The articulated vehicle having a transverse axis and comprising several vehicle parts as set forth in claim 1, characterized in that at least one pitch bearing (38) having a pitch axis extending parallel to the transverse axis of the vehicle is provided on the chassis of the vehicle part (1, 2).

3. The articulated vehicle comprising several vehicle parts as set forth in claim 2, characterized in that the pitch joint (38) accommodates the roll joint (40).

4. The articulated vehicle having a longitudinal axis and comprising several vehicle parts as set forth in claim 1, characterized in that a roll joint (40) having an axis extending parallel to the longitudinal axis of the vehicle is disposed on the chassis of the vehicle part (1, 2).

5. The articulated vehicle comprising several vehicle parts as set forth in claim 4, characterized in that the roll joint (40) comprises a pivot member (48) that is carried in the roll joint housing (45) for rotation about a given angle of rotation.

6. The articulated vehicle comprising several vehicle parts as set forth in claim 5, characterized in that the pivot member (48) is carried in the roll joint housing (45) for rotation against a force.

7. The articulated vehicle comprising several vehicle parts as set forth in claim 5, characterized in that the pivot member (48) is carried in an elastomer body (49) in the roll joint housing (45).

8. The articulated vehicle comprising several vehicle parts as set forth in claim 4, characterized in that the roil joint (40) is connected to the buckling joint (51) through a joint carrier (50).

9. The articulated vehicle comprising several vehicle parts as set forth in claim 8, characterized in that the joint carrier (50) comprises a damping element (60) that is connected to the coupling carrier (30).

10. The articulated vehicle comprising several vehicle parts as set forth in claim 1, characterized in that a roll joint (40) having an axis extending parallel to the longitudinal axis of the vehicle is disposed on the chassis of the vehicle part (1, 2), in that the pitch joint (38) accommodates the roll joint (40), and in that the roll joint (40) comprises a roll joint housing (45), with said pitch joint (38) being mounted to said roll joint housing (45).

11. The articulated vehicle comprising several vehicle parts as set forth in claim 10, characterized in that the roll joint housing (45) comprises two laterally projecting pitch bearing journals (41) forming part of the pitch joint (38).

12. The articulated vehicle comprising several vehicle parts as set forth in claim 1, characterized in that a gangway platform (21) is provided between the vehicle parts (1, 2), above the joint device.

13. The articulated vehicle comprising several vehicle parts as set forth in claim 12, characterized in that the gangway platform (21) comprises a rotary plate (21a).

14. The articulated vehicle comprising several vehicle pans as set forth in claim 13, characterized in that the rotary plate (21a) is fastened to at least the coupling carrier (30).

15. The articulated vehicle comprising several vehicle parts as set forth in claim 1, characterized in that the coupling means (25) are located on the coupling carrier (30), in the region of the center longitudinal axis of the articulated vehicle.

16. The articulated vehicle comprising several vehicle parts as set forth in claim 15, characterized in that female and male coupling members (26, 27, 28, 29) for electrical, compressed air and/or hydraulic lines am provided on either side of the coupling means (25) on the coupling carrier (30).

17. The articulated vehicle comprising several vehicle parts as set forth in claim 1, characterized in that the vehicle part (1, 2) comprises an insertion opening (1a, 2a) for receiving the joint (20) in the region of a bottom floor of the vehicle.

18. The articulated vehicle comprising several vehicle parts as set forth in claim 17, characterized in that the insertion opening comprises an insertion frame.

19. The articulated vehicle comprising several vehicle parts as set forth in claim 1, characterized in that the coupling frame (12) comprises a mounting frame (11) that is peripherally disposed about said coupling frame (12) and serves to fasten the bellows (13).

20. The articulated vehicle comprising several vehicle parts as set forth in claim 19, characterized in that the mourning frame (11) comprises, in the roof region of the bellows (13), in the center longitudinal axis of the articulated vehicle, male and female coupling members (24) for electrical, compressed air and/or hydraulic lines.

21. The articulated vehicle comprising several vehicle parts as set forth in claim 1, characterized in that the open front side of the vehicle part (1, 2) is closable.

22. An articulated vehicle comprising of several vehicle parts (1, 2) which are couplable together, each vehicle part (1, 2) comprising at least two axles and one coupling frame (12) that is connected to said vehicle part (1, 2) through a bellows (13), a joint device (20, 31) for coupling the vehicle parts (1, 2) to each other being provided between said vehicle part (1, 2) and said coupling frame (12), said joint device (31) comprising a coupling carrier that is located approximately in the plane of said coupling frame (12), said coupling carrier (30) comprising at least coupling means (25) for coupling to the joint device (20, 31) of the other vehicle part (1, 2), a roll joint having an axis extending parallel to the longitudinal axis of the vehicle being disposed on the chassis of the vehicle part (1, 2), said roll joint (40) comprising a pivot member (48) mat is carried in the roll joint housing (45) for rotation about a given angle of rotation, said pivot member (48) being carried in the roll joint housing (45) in an elastomer body (49).

23. An articulated vehicle comprising of several vehicle parts (1, 2) which are couplable together, each vehicle part (1, 2) comprising at least two axles and one coupling frame (12) that is connected to said vehicle part (1, 2) through a bellows (13), a joint device (20, 31) for coupling the vehicle parts (1, 2) together being provided between said vehicle part (1, 2) and said coupling frame (12), said joint device (20, 31) comprising a coupling carrier (30) that is located approximately in the plane of said coupling frame (12), said coupling carrier (30) comprising at least coupling means (25) for coupling to the joint device (20, 31) of the other vehicle part (1, 2), said coupling means (25) being arranged on the coupling carrier, in the region of the center longitudinal axis of the articulated vehicle, female and male coupling carriers (26, 27, 28, 29) for electrical, compressed air and/or hydraulic lines being provided on either side of the coupling means (25) on the coupling carrier (30).

24. An articulated vehicle comprising of several vehicle parts (1, 2) which are couplable together, each vehicle part (1, 2) comprising at least two axles and one coupling frame (12) that is connected to said vehicle part (1, 2) through a bellows (13), a joint device (20, 31) for coupling the vehicle parts (1, 2) together being provided between said vehicle part (1, 2) and said coupling frame (12), said joint device (20, 31) comprising a coupling carrier (30) that is located approximately in the plane of said coupling frame (12), said coupling carrier (30) comprising at least coupling means (25) for coupling to the joint device (20, 31) of the other vehicle part (1, 2), said coupling frame (12) comprising a mounting frame that is peripherally disposed about said coupling frame (12) and serves to fasten the bellows (13), said mounting frame (11) comprising, in the roof region of the bellows (13), in the center longitudinal axis of the vehicle, male and female coupling members (24) for electrical, compressed air and/or hydraulic lines.

* * * * *